United States Patent
Gottlieb et al.

(10) Patent No.: US 6,173,912 B1
(45) Date of Patent: Jan. 16, 2001

(54) PLATE VALVE FOR THE DOSING OF LIQUIDS

(75) Inventors: Bernhard Gottlieb, Munich; Andreas Kappel, Brunnthal; Randolf Mock, Munich; Bernhard Fischer, Toeging A. Inn; Hans Meixner, Haar, all of (DE); Jingming Jim Shen, Newport News, VA (US)

(73) Assignee: Siemens Aktiengesellschaft, Munich (DE)

( * ) Notice: Under 35 U.S.C. 154(b), the term of this patent shall be extended for 0 days.

(21) Appl. No.: 09/336,332

(22) Filed: Jun. 18, 1999

(51) Int. Cl.[7] .................................................. F02M 61/00
(52) U.S. Cl. .................................. 239/533.12; 239/533.3
(58) Field of Search ........................ 239/533.2, 533.3, 239/533.7, 533.9, 533.12, 533.15

(56) References Cited

U.S. PATENT DOCUMENTS

| | | | |
|---|---|---|---|
| 2,255,203 | * | 9/1941 | Wiegand ........................ 239/533.3 X |
| 2,555,803 | * | 6/1951 | Mashinter et al. .......... 239/533.12 X |
| 4,958,771 | * | 9/1990 | Klomp ........................ 239/533.12 X |
| 5,685,492 | * | 11/1997 | Davis et al. ................. 239/533.12 X |

* cited by examiner

Primary Examiner—Lesley D. Morris
(74) Attorney, Agent, or Firm—Schiff Hardin & Waite

(57) ABSTRACT

In a plate valve, particularly a cone spray valve, the valve gap, or respectively, seal gap (6) which is present in the open condition is not designed with parallel faces, but with cross-sectional areas which remain the same given increasing radius. This approach applies to a set from the interior outward. The advantage consists in the avoidance of cavitation and in the achievement of a low closing force for sealing the valve.

4 Claims, 2 Drawing Sheets

PLATE VALVE FOR THE DOSING OF LIQUIDS

BACKGROUND OF THE INVENTION

The invention relates to a plate valve which is sealed by corresponding surfaces on a valve seat of the valve housing and on the plate, which is connected to a valve spindle. A stroke of the valve spindle opens the valve and exposes a seal gap, which is usually radially symmetrically constructed, particularly in the shape of a truncated cone. The geometry of the flow in the seal gap and after exiting the valve decisively determines the continuing state of the liquid.

FIGS. 3 and 4 illustrate a typical plate valve according to the prior art in an axial section. This valve serves to generate a liquid cone spray. The liquid first flows axially in the annular gap 5 between a valve spindle 2 and the valve body 3 downward from above in the direction of the valve plate 3 and is deflected in the direction of a valve seat 4 which is incorporated into the valve body 1. Given an open valve, the liquid thus exits the valve gap (also referred to as a seal gap) which is located between the valve plate 3 and the valve seat 4 in the shape of a cone spray. This cone spray comprises a cone angle α which is pressed on by valve plate 3 and valve seat 4.

Previously common cone angles a of the plate seal face and cone angles β of the valve seat face for generating a liquid-tight union have been selected equally large (α=β). The problem regularly arises that, given an open valve, the flow cross-section, which is shaped like a truncated cone, in the seal gap 6 grows linearly with the radius (DI<2R<DA, with DI=inner diameter of the seal gap 6 and DA=outer diameter of the seal gap 6). The formula for the area, or respectively, cross-section A of the flow cross-section, which is shaped like a truncated cone, in the seal gap 6 derives from elementary geometrical considerations:

$$A = \Pi \cdot HA \cdot \sin(\alpha/2) \cdot (2R - 0.5 HA \cdot \sin(\alpha))$$

with HA=outer height of the gap.

In the prior art, with α=β, the difference between the outer height HA of the gap 6 and the inner height HI of the gap 6 corresponds to the stroke executed by the valve spindle.

With dimensions that are typical in fuel injection valves, the following applies: inner diameter DI=4 mm; outer diameter DA=4.5 mm.

A relative change derives of the minimal flow cross-section from the inflow of the liquid to the outflow of the liquid in relation to the valve gap, or respectively, seal gap 6, which can be calculated accordingly:

$$(DA-DI)/(DI-0, 5HA \cdot \sin(\alpha)) \approx 0.5/4 = 0.125 = 12.5\%.$$

In the open condition, the cone spray valve thus represents a diffusor. Such a sharp increase of the flow cross-section over such a short distance leads to a heavily delayed flow and to cavitation. Such cavitation has already been experimentally observed in injection valves with a seal face such as is described above. Given the decompression from ca. 200 bar to 1 bar, which corresponds to 2%, the volume increase cannot compensate this geometric expansion of the traversed cross-section by means of the liquid itself, whose compressibility is $\kappa = 10^{-9}$ m$^2$/N, particularly in fuels,. For this reason, this sharp drop in pressure is associated with vaporization phenomena and cavitation.

SUMMARY OF THE INVENTION

The invention is based on the object of preventing, in a plate valve, flow delays that are associated with cavitation.

The invention is based on the realization that the geometry of the plate valve should be adapted such that the flow cross-section in the seal gap is independent of the radius. This occurs in that, in contrast to the prior art, the face of the valve seat 4 at the valve body the corresponding seal face at the valve plate 3 are not oriented in parallel fashion as previously. The cone angle α of the valve plate is larger than the cone angle β of the valve seat 4. The particular advantages resulting from this modification of the valve seat geometry and/or of the valve plate geometry prevent cavitation. Furthermore, the seal of the valve, which now exists as a line seal, requires less closing force for sealing than does a surface seal, such as had to be expended given the parallel construction of the seal faces.

Advantageous developments of the invention provide that the liquid to be dosed flows out from the interior. In addition, the plate valve is advantageously designed as a special steel valve.

DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

To calculate an area A of the cross-section of the seal gap, the following equation approximately applies:

$$A = \Pi HA \cdot \sin(\alpha/2) \cdot (2R - 0.5 HA \cdot \sin(\alpha)) \approx \Pi \cdot HA \cdot \sin(\alpha/2) \cdot (2R) \quad (1)$$

Since the first addend (2R) in the approximation equation (1) is usually much larger than the second addend (0.5 HA sin (α)) in applications in piezoinjector technology, this addend can be neglected in a good approximation:

$$0.5 HA \sin(\alpha)/DI < 1\% \text{ with } 25 \ \mu m < HA < 60 \ \mu m.$$

Using the approximation formula (1) and the requirement that the flow cross-section may not vary over the width of the seal gap, a condition is initially derived for the seal gap height at the liquid inlet, resulting in the following condition for the cone angle:

inner cross-sectional area AE=outer cross-sectional area AA
$$\Pi \cdot HA \cdot \sin(\alpha/2) \cdot DA = \Pi \cdot HI \cdot \sin(\alpha/2) \cdot DI, \text{ whereby } HI = HA \cdot DA/DI.$$

If HA=30 $\mu$m, DI=4 mm, DA=4.5 mm, then HI=33.75 $\mu$m and ΔH=(HI−HA)=3.75 $\mu$m.

$$\tan(\alpha/2) = (DA-DI)/(2Y0) \Rightarrow YO = (DA-DI)/(2\tan(\alpha/2))$$

$$Y1 = Y0 + \Delta H$$

$$Y1 = Y0 + HA(DA-DI)/DI$$

$$\tan(\beta/2) = (DA-DI)/(2Y1)$$

Typical numerical values in a benzene injector are:
HA=30 μm, DI=4 mm; DA=4.5 mm, α=90°.
As a result:

HI=33.75 μm

ΔH=(HI−HA)=3.75 μm and

Y0=0.25 mm and Y1=0.25375 mm.

From this can be derived: tan(β/2)=0.25/0.25375⇒β=89.15°.

So that cavitation is reliably prevented in all valve strokes with (0<H<HA), then, with DI=4 mm and DA=4.5 mm and α=90°, the cone angle β must be less than or equal to 89.15°.

Figure 3:
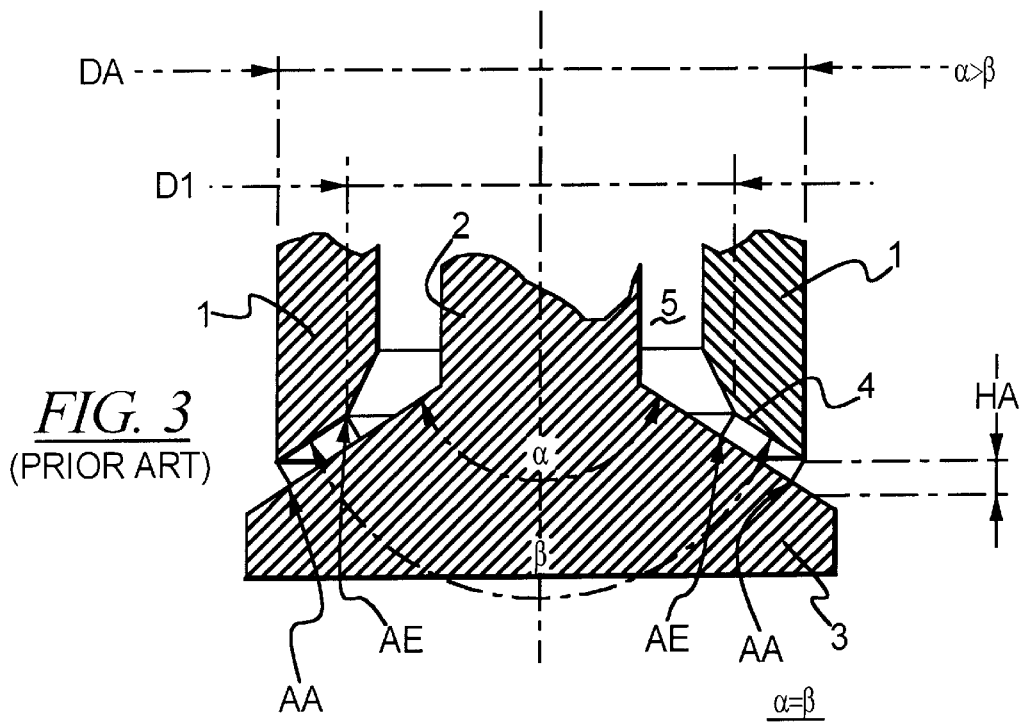
FIG. 3 and FIG. 4 depict a plate valve according to the prior art.
Figure 4:
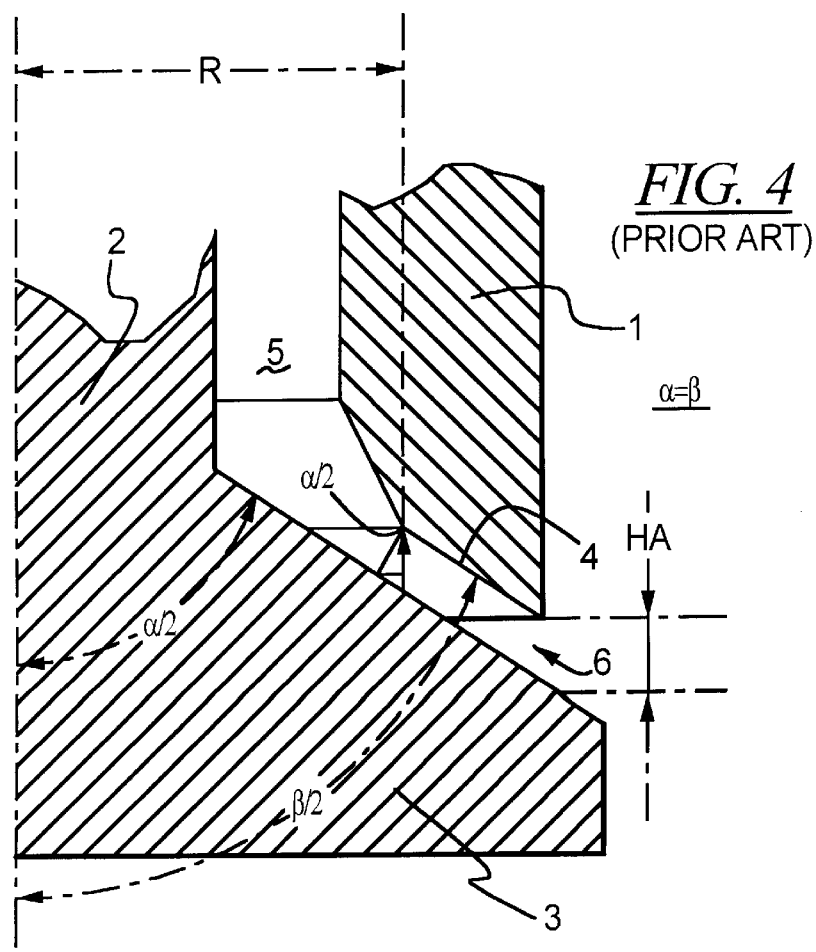

The FIGS. 3 and 4 represent sectional views through a plate valve which is designed according to the prior art. It can be seen that the valve seat 4 is constructed plane and corresponds to the opposite face of the valve plate 3. The face at the valve plate comprises the cone angle α. The face of the valve seat 4 comprises the cone angle β, the two angles being equal. The seal gap 6, i.e. the gap which emerges when the valve spindle 2 transfers a stroke and opens the valve, is thus defined by two parallel cone faces. Additional reference characters are the radius R, which is considered in connection with a cross-sectional area A; the areas of cross-section AE at the entry of the liquid into the seal gap 6 and M at the exit of the liquid from the seal gap 6. This type of system which is designed with equal cone angles will suffer damage due to cavitation, since, with increasing radius, the enlargement of the cross-sectional area creates the condition for a cavitation. FIG. 4 depicts the angle α/2 and β/2, respectively, with reference to the dashed line representing the axis of symmetry.

Figure 1:
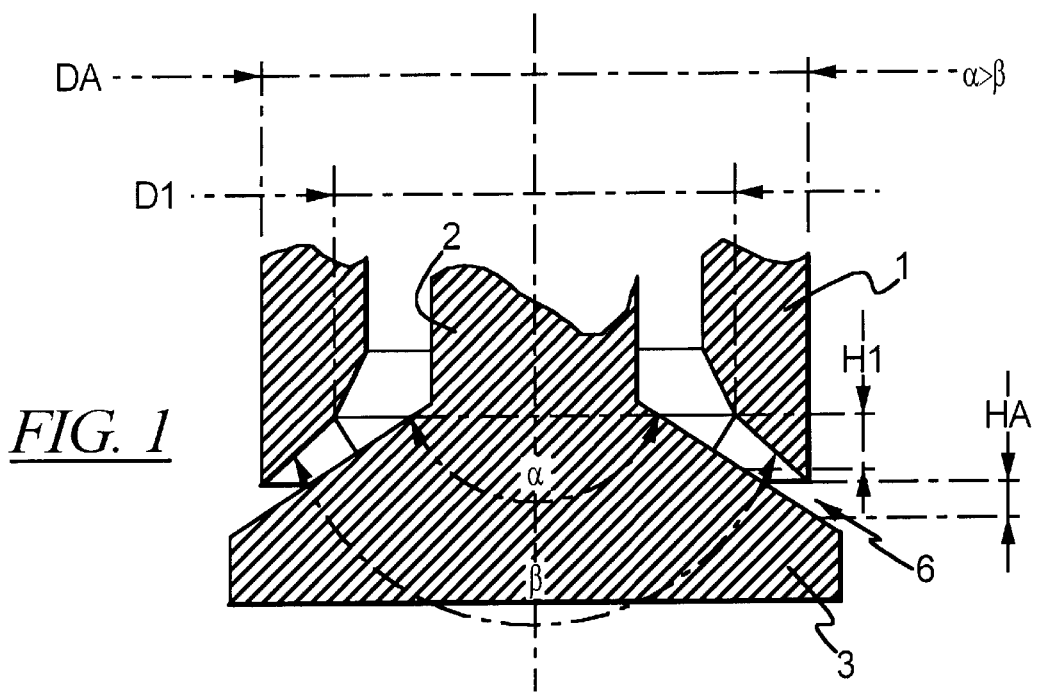
FIG. 1 depicts an inventive plate valve
Figure 2:
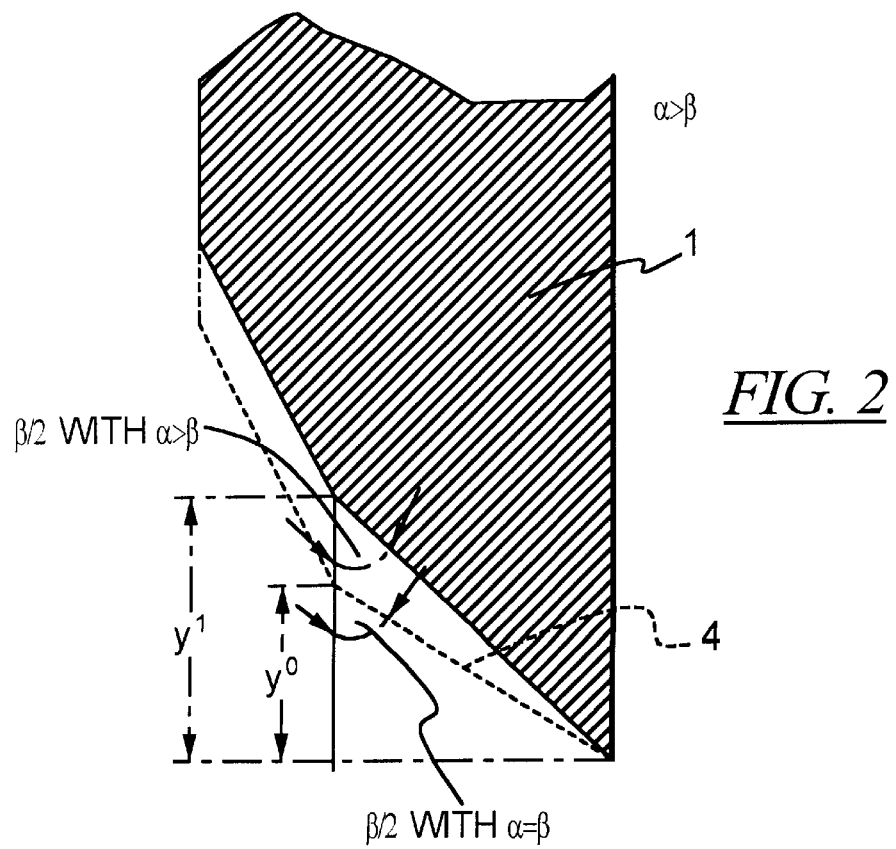
FIG. 2 depicts a section from FIG. 1 illustrating the valve body 1 with the valve seat 4 in an enlarged view.

FIGS. 1 and 2 render an exemplifying embodiment of the invention. It can be seen according to FIG. 2 that the corresponding faces on the valve body 1 and on the valve plate 3 for representing the sealing action are no longer parallel. Thus, given a closed valve, a line contact of the represented components will effect the sealing. In FIGS. 1 and 2, the angle α is respectively greater than the angle β. The cross-sectional area A at the entry of the liquid as it flows out from the interior, given an open valve and the existing seal gap 6, is equal to or greater than the cross-sectional area A at the end of the seal gap 6, as viewed with the flow. Accordingly, the inner height HI of the seal gap 6 is greater than the outer height HA. The inner cross-sectional area AE or the outer cross-sectional area M can be calculated with the above formulas, respectively. FIG. 2 shows one possible modification of the geometry at the valve seat for realizing the invention. The dotted line with the height Y0, which is illustrated in FIG. 2, represents an embodiment corresponding to the prior art with α=β. This embodiment contains the valve seat which abuts the valve housing in plane fashion. The hatched area, or respectively, shape of the valve body 1 is inventively adapted. In this case, the sealing of the valve is effected by the outer peak of the valve body 1 in conjunction with the valve plate 3. The cone angle β, or respectively, β/2 is respectively illustrated for a geometry according to the prior art (α=β) and for a geometry according to the invention (α>β). This guarantees that an expansion of the seal gap area does not occur with increasing radius, given a set of the liquid from the interior outward. The above described representation can be analogously applied to a valve in which the liquid flows from the outside in. The geometry would have to be analogously adapted relative to the prior art. A valve of this type would not be an atomizing valve, but a shutoff valve for governing a valve opening process given extremely high pressures.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A plate valve for dosing liquids, comprising:

a valve body having a valve seat;

a valve plate which is connected to a valve spindle and which corresponds to the valve seat;

the valve plate abuts the valve seat in a closed condition and a seal gap is formed in an open condition, which gap has a gap cross-section that is one of constant and decreasing in a direction of flow of a liquid.

2. The plate valve according to claim 1, wherein the liquid is directed outward from an interior of the plate valve.

3. The plate valve according to claim 1, wherein the plate valve is a cone spray valve.

4. A plate valve for dosing liquids, comprising:

a valve body having a valve seat;

a cone spray valve which is connected to a valve spindle and which corresponds to the valve seat;

the cone spray abuts the valve seat in a closed condition and a seal gap is formed in an open condition, which gap has a gap cross-section that is one of constant and decreasing in a direction of flow of a liquid, the liquid being directed toward an interior of the plate valve.

* * * * *